(12) United States Patent
Houston

(10) Patent No.: US 7,367,314 B2
(45) Date of Patent: *May 6, 2008

(54) GOVERNOR SYSTEM FOR GASOLINE POWERED VEHICLES

(75) Inventor: Steven W. Houston, Evans, GA (US)

(73) Assignee: Textron, Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/623,375

(22) Filed: Jan. 16, 2007

(65) Prior Publication Data

US 2007/0113826 A1 May 24, 2007

Related U.S. Application Data

(63) Continuation of application No. 10/610,472, filed on Jun. 30, 2003, now Pat. No. 7,162,999, which is a continuation of application No. 10/195,855, filed on Jul. 15, 2002, now Pat. No. 6,612,286.

(51) Int. Cl.
*F02D 31/00* (2006.01)
*F02D 11/04* (2006.01)

(52) U.S. Cl. .................. 123/376; 123/363; 123/403

(58) Field of Classification Search ............. 123/319, 123/342, 344, 363, 376, 377, 403; 180/170, 180/171
See application file for complete search history.

(56) References Cited

U.S. PATENT DOCUMENTS

| 3,543,601 A | 12/1970 | Berger |
| 3,675,731 A | 7/1972 | Stopera |
| 3,721,309 A | 3/1973 | Donaldson |
| 3,888,219 A | 6/1975 | Rogerson |
| 3,918,320 A | 11/1975 | Glick, Jr. et al. |
| 3,954,152 A | 5/1976 | Duttarer et al. |
| 3,981,207 A | 9/1976 | Stant et al. |
| 4,016,842 A | 4/1977 | Kittler |
| 4,075,906 A | 2/1978 | Schimpf et al. |
| 4,543,932 A | 10/1985 | Sturdy |
| 4,993,385 A | 2/1991 | Miyamoto et al. |
| 6,612,286 B1 | 9/2003 | Houston |
| 7,162,999 B2 * | 1/2007 | Houston ............ 123/376 |

* cited by examiner

*Primary Examiner*—T. M Argenbright
(74) *Attorney, Agent, or Firm*—Harness Dickey & Pierce P.L.C.

(57) ABSTRACT

A governor system is provided for limiting a degree of throttle travel of a throttle as a function of rotational speed of a drive axle. The governor system includes a governor shaft rotatably supported by the drive axle and operably interconnected to internal components of the drive axle for varying a feedback torque, a governor arm fixed for rotation with the governor shaft, a throttle cable interconnected with the governor arm for applying a first pulling force to the throttle and an accelerator cable resiliently interconnected with the governor arm to apply a second pulling force to the governor arm. The second pulling force induces rotation of the governor arm for applying a torque on the governor shaft. The torque balances with the feedback torque of the governor shaft for limiting the second pulling force as a function of the rotational speed of the drive axle.

18 Claims, 3 Drawing Sheets

GOVERNOR SYSTEM FOR GASOLINE POWERED VEHICLES

CROSS-REFERENCE TO RELATED APPLICATIONS

This application is a continuation of U.S. patent application Ser. No. 10/610,472 filed Jun. 30, 2003, now U.S. Pat. No. 7,162,999 issued Jan. 16, 2007, which is a continuation of U.S. patent application Ser. No. 10/195,855 filed Jul. 15, 2002, now U.S. Pat. No. 6,612,286 issued Sep. 2, 2003. The disclosures of the above applications are incorporated herein by reference.

FIELD OF THE INVENTION

The present invention relates to gasoline powered vehicles and more particularly to governor systems for gasoline powered vehicles.

BACKGROUND OF THE INVENTION

Many vehicles, such as golf cars, include a governor system for limiting the degree of throttle to correspondingly limit the speed at which the vehicle may travel. Typically, vehicles include an engine, a transmission and a drive axle receiving drive torque from the engine, through the transmission. Generally, governor systems include a plurality of weights disposed about an input shaft of the drive axle, which are configured to pivot away from the input shaft as a result of the centrifugal forces generated by the angular velocity of the input shaft. The weights pivot outward against a set of sliding spacers, which in turn actuate a governor shaft extending inside the drive axle. As the angular velocity of the input shaft increases so does the centrifugal force, resulting in a torque produced through the governor shaft. Thus, the torque produced through the governor shaft is linear and directly proportional to the angular velocity of the input shaft.

A ground speed control mechanism, or governor system, is provided to limit the maximum vehicle speed. Traditional governor systems include a control arm with a pivotal box spring assembly, an accelerator cable input interconnecting the accelerator pedal and a throttle output interconnecting the throttle. The box spring assembly includes a threaded rod, a pivot bracket, a compression spring, spring retainers and an adjustment nut. The governed speed is preset by the manufacturer by adjusting the compression of the compression spring with the adjustment nut. A wire is then passed through a hole in the end of the threaded rod and a hole through the adjustment nut, the ends of which are soldered together as a means to maintain the governor setting over time.

When the accelerator pedal is actuated, the accelerator cable pulls on the box spring, which in turn applies a force to the control arm. The control arm then rotates and actuates the throttle linkage to open the throttle. As the accelerator is depressed and the vehicle accelerates, the torque exerted on the control arm by the governor shaft correspondingly increases. When this torque becomes greater than that produced by the box spring assembly, the control arm rotates, compressing the box spring further, thereby relieving the throttle linkage to enable closure of the throttle. As the vehicle slows, the torque exerted on the control arm by the governor shaft correspondingly decreases, enabling the control arm to rotate, thereby actuating the throttle linkage to again open the throttle. The result is a relatively constant vehicle speed, regardless of load.

The governor system described above, while functional, retains several disadvantages. The throttle linkage and its constituent components may be easily tampered with in order to increase the maximum speed of the vehicle. This generally results in the throttle not fully closing, causing engine back fire and poor low speed drivability. Other components wear over time leading to a significant loss in throttle travel preventing wide open throttle, thereby limiting hill climbing and other power intensive activities. Further, the overall complexity of the governor system results in tolerance stack-ups that require a long range of adjustment.

Therefore, it is desirable in the industry to provide an improved governor system for limiting a maximum vehicle speed. The improved governor system should be simple in construction, having a reduced number of components over traditional governor systems, for alleviating the disadvantages associated therewith. Further, the improved governor system should reduce the opportunity for tampering, to protect the engine and maintain drivability characteristics across all speed ranges.

SUMMARY OF THE INVENTION

Accordingly, the present invention provides a governor system for limiting a degree of throttle travel of a throttle as a function of rotational speed of a drive axle. The governor system includes a governor shaft rotatably supported by the drive axle and operably interconnected to internal components of the drive axle for varying a feedback torque, a governor arm fixed for rotation with the governor shaft, a throttle cable interconnected with the governor arm for applying a first pulling force to the throttle and an accelerator cable resiliently interconnected with the governor arm to apply a second pulling force to the governor arm. The second pulling force induces rotation of the governor arm for applying a torque on the governor shaft. The torque balances with the feedback torque of the governor shaft for limiting the second pulling force as a function of the rotational speed of the drive axle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
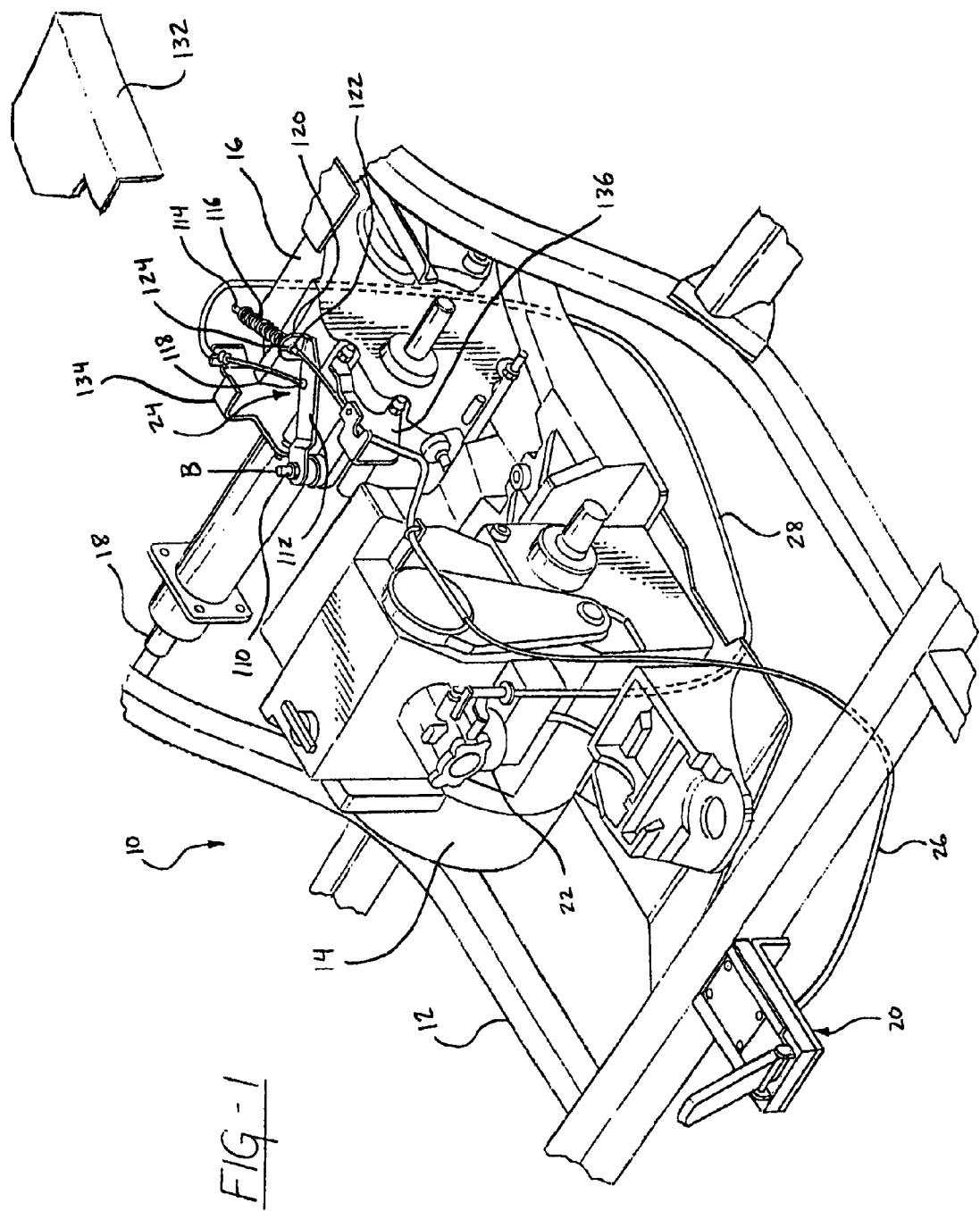
FIG. 1 is a perspective view of a vehicle driveline implementing a governor system in accordance with the principles of the present invention.

With reference to FIG. 1, a vehicle driveline 10 is shown supported by a frame 12. The vehicle driveline 10 is preferably that of a golf car, however, it will be appreciated that the teachings of the present invention are applicable to any type of driveline known in the art. The vehicle driveline 10 includes an engine 14 operably interconnected to a drive axle 16 for providing drive torque thereto. The drive axle 16 includes axle shafts 18 extending therefrom for driving a pair of wheels (not shown). A pedal assembly 20 is provided for manipulating a throttle 22 of the engine 14 for providing a degree of throttle corresponding to a desired torque output of the engine 14. A governor system 24 is operably disposed intermediate to the throttle 22 and the pedal assembly 20 for limiting the degree of throttle, thereby limiting the torque output of the engine 14, as discussed in further detail herein below. An accelerator cable 26 interconnects the pedal assembly 20 and governor system 24 and a throttle cable 28 interconnects the governor system 24 and the throttle 22.

Figure 2:
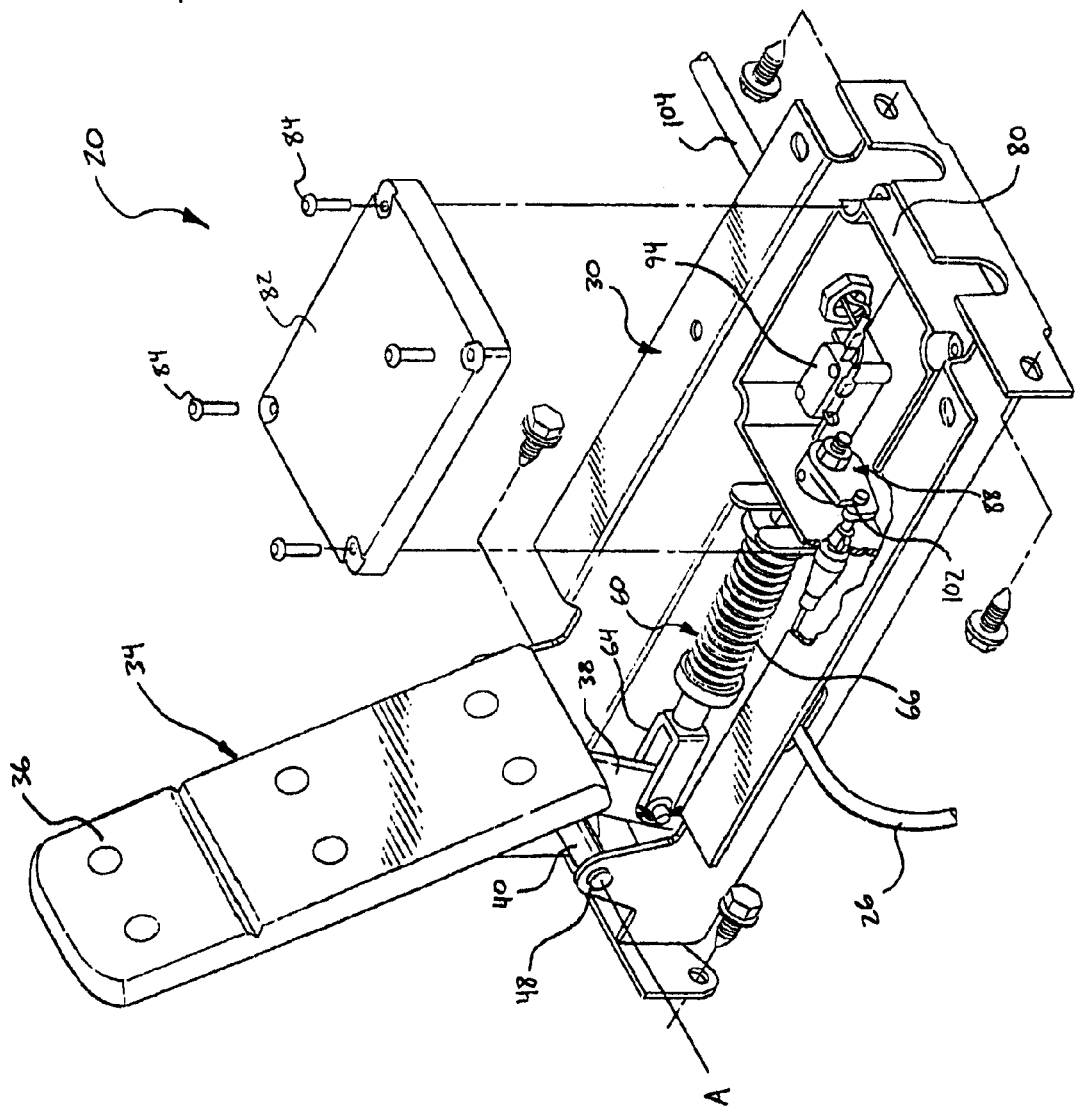
FIG. 2 is a partially exploded view of an accelerator pedal assembly of the vehicle driveline of FIG. 1.
Figure 3:
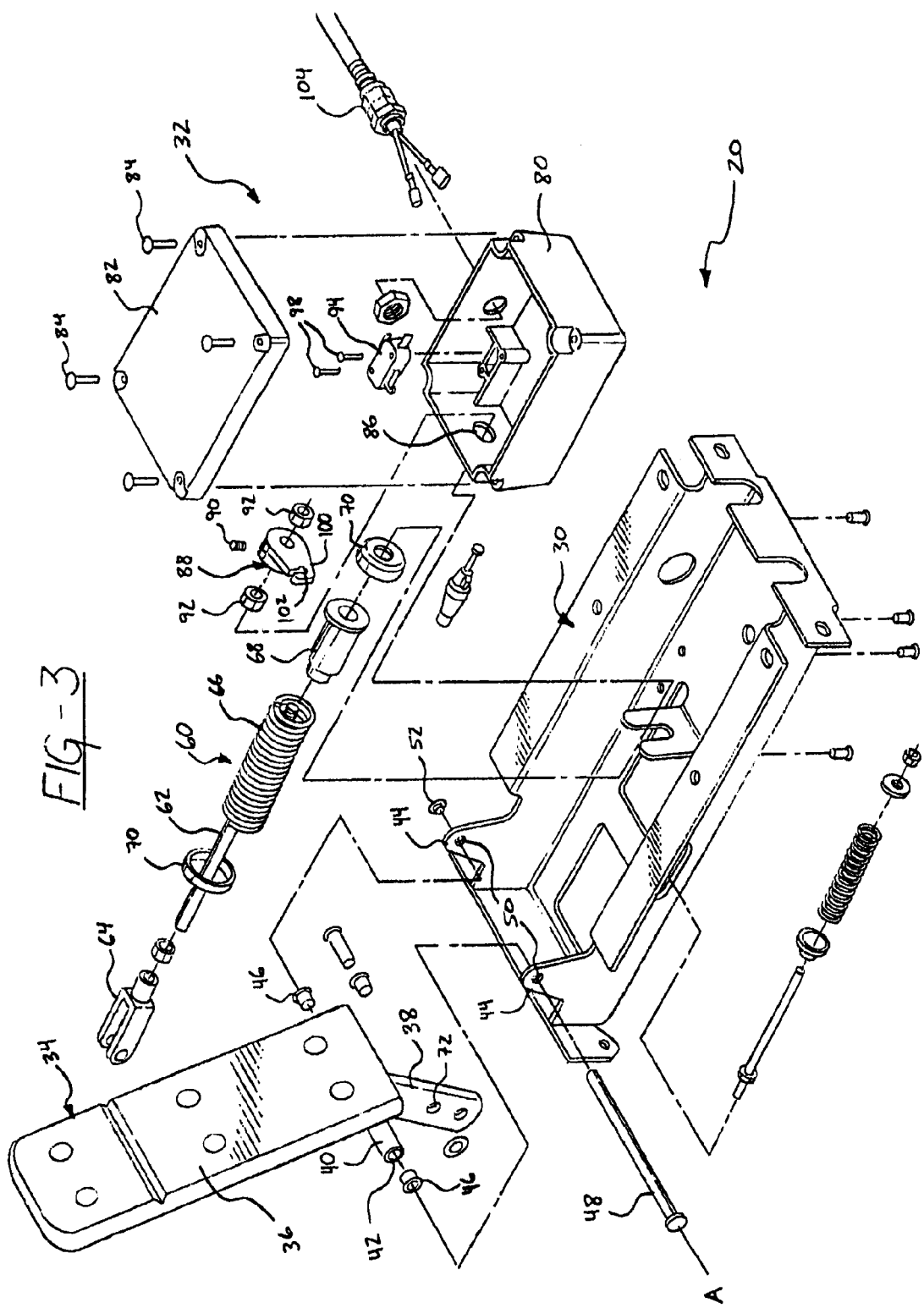
FIG. 3 is an exploded view of the accelerator pedal assembly of FIG. 2.

With particular reference to FIGS. 2 and 3, the pedal assembly 20 will be described in further detail. The pedal assembly 20 includes a pedal bracket 30 supporting a pedal box 32 which is operably interconnected with an accelerator pedal 34. The accelerator pedal 34 is pivotally supported by the bracket 30 and includes a flat pedal portion 36, a downward extending arm 38 and a pivot tube 40 having a bore 42 therethrough. The accelerator pedal 34 is pivotally supported between upwardly extending supports 44 of the bracket 30. More particularly, a pair of bushings 46 are received into the bore 42 at each end of the pivot tube 40, for receiving a pivot pin 48 therethrough. The pivot pin 48 is also received through apertures 50 of the supports 44 and includes a lock nut 52 attached thereto for retaining the pivot pin 48 in place. In this manner, the accelerator pedal 34 is pivotal about an axis A for driving the extending arm 38 about an arcuate path within the bracket 30.

An accelerator rod assembly 60 operably interconnects the accelerator pedal 34 and internal components of the pedal box 32. The accelerator rod assembly 60 includes an accelerator rod 62, a clevis 64, a compression spring 66, a bushing 68, and a pair of spring retainers 70. The clevis 64 is threaded to an end of the accelerator rod 62 and pivotally connects to an aperture 72 of the extending arm 38 of the accelerator pedal 34. The accelerator rod 62 is received through the spring retainers 70, the compression spring 66 and bushing 68, with the compression spring 66 seated between the spring retainers 70. The accelerator rod 62 resiliently extends into the pedal box 32 upon actuation of the accelerator pedal 34, as described in further detail herein.

The pedal box 32 includes a lower box portion 80 and a cover 82 selectively secured thereto by fasteners 84. The lower box portion 80 includes an aperture 86, through which the accelerator rod 62 extends. A micro-switch cam 88 is provided and is secured to an end of the accelerator rod 62 by a set screw 90, between a pair of lock nuts 92. A micro-switch 94 is secured to a support structure 96 within the lower box portion 80 by fasteners 98. The micro-switch 94 is selectively engaged by the micro-switch cam 88 as the accelerator rod 62 is caused to resiliently extend into the pedal box 32. The micro-switch cam 88 includes an extended portion 100 having an aperture 102 therethrough for securing an end of the accelerator cable 26 thereto. A wiring harness 104 is interconnected with the micro-switch 94 to enable transfer of an electric signal from the micro-switch 94 to an engine controller (not shown).

The governor system 24 is operably supported on the drive axle 16, intermediately disposed between the pedal assembly 20 and the throttle 22. Referring to FIG. 1, the governor system 24 includes a governor shaft 110 extending from the drive axle 16, a governor arm 112, a governor rod 114 and a compression spring 116. The governor shaft 110 is operably interconnected to internal components of the drive axle 16 and is rotatable about an axis B. The amount of torque required to rotate the governor shaft 110 is controlled by the internal components of the drive axle 16 and is a function of the rotational speed thereof (i.e. vehicle speed). The governor arm 112 is fixed for rotation with the governor shaft 110 and extends generally perpendicular to the axis B.

The governor arm 112 includes an intermediate aperture 118 for interconnection with an end of the throttle cable 28 and a distal bracket 120 for interconnection with the accelerator cable 26. More particularly, the governor rod 114 is fixedly interconnected to an end of the accelerator cable 26 and includes a stop 122 formed thereabout. The governor rod 114 is slidably received through an aperture 124 of the bracket 120. The compression spring 116 is disposed about the governor rod 114 and is positioned between a bushing (not shown) abutting the bracket 120 and a washer (not shown) fixed thereto by a lock nut (not shown) for resiliently interconnecting the governor rod 114 to the governor arm 112.

As the governor rod 114 is caused to pull the governor arm 112, thereby rotating the governor shaft 110, the compression spring 116 is caused to compress as a function of the amount of torque required to rotate the governor shaft 110. In other words, the amount of torque required to rotate the governor shaft 110, which is a function of the rotational speed of the internal components of the drive axle 16, induces a feedback force, biasing against the pulling force of the governor rod 114. In this manner, the compression spring 116 is caused to compress, whereby the pulling force of the governor rod 114 balances against the feedback force of the governor shaft 110 to maintain a maximum vehicle speed.

A cover 132 is further provided for covering the governor system 24. The cover 132 is riveted to a throttle cable bracket 134, to which the throttle cable 28 is fixedly attached, and an accelerator cable bracket 136, to which the accelerator cable 26 is fixedly attached. The cover 132 covers the governor shaft 110, governor arm 112, governor rod 114 and compression spring 116 for prohibiting modification of the governor system 24. Further, because the cover 132 is riveted to the brackets 134,136, removal of the cover 132 is only possible by inflicting significant damage thereto.

With reference to FIGS. 1 and 2, a more detailed description of the operation of the governor system 24 will be provided. In order to induce drive torque output from the engine 14, an operator must press the accelerator pedal 34 to induce actuation of the throttle 22. Upon depression of the accelerator pedal 34, the accelerator pedal is caused to rotate about the axis A, thereby swinging the extending arm 38 against the accelerator rod 62 for driving the accelerator rod 62 into the pedal box 32 against a back biasing force provided by the compression spring 66. As the accelerator rod 62 moves axially into the pedal box 32, the micro-switch cam 88 is caused to move axially therewith, thereby performing dual functions: 1) contacting the micro-switch 94, and 2) applying a pulling force through the accelerator cable 26. As the micro-switch cam 88 contacts the micro-switch 94, an electronic signal is sent to an engine controller for initiating operation of the engine 14. It should be noted that in many vehicle applications, such as a golf car, the engine 14 is off during periods of non-use and operation thereof is initiated upon accelerator pedal 34 depression.

Concurrently, the micro-switch cam 88 pulls the accelerator cable 26 to induce the pulling force therethrough. The pulling force is translated through the governor rod 114 and through the compression spring 116, ultimately pulling the governor arm 112 for inducing rotation thereof about the axis B. Initially, with the vehicle starting from rest, there is no feedback force translated from the governor shaft 110 through the governor arm 112. Thus, as the governor rod 114 applies the pulling force to the governor arm 112, through the compression spring 116, the governor arm 112 is caused to rotate about the axis B with minimal compression of the compression spring 116. Rotation of the governor arm 112 about the axis B induces a pulling force through the throttle cable 28 for manipulating the throttle 22 to accelerate the vehicle.

As the vehicle speed increases, the rotational speed of the internal components of the drive axle 16 correspondingly increases, thereby inducing the increasing feedback force through the governor shaft 110. As the feedback force increases, the governor shaft 110 is caused to rotate back about the axis B, thereby rotating the governor arm 112 against the compression spring 116. The compression spring 116 is caused to compress until a balance is achieved between the pulling force and the feedback force. However, because the governor arm 112 rotates back about the axis B until this balance is achieved, the pulling force through the throttle cable 28 is somewhat relieved for reducing the degree of throttle, thereby limiting the maximum vehicle speed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A governor system for limiting a degree of throttle travel of a throttle as a function of rotational speed of a drive axle, comprising:
    a governor shaft operably interconnected to the drive axle, which varies a feedback torque of said governor shaft based on a rotational speed of the drive axle;
    an accelerator cable resiliently interconnected with said governor shaft to induce a first torque acting against said feedback torque on said governor shaft, said first torque balancing with said feedback torque of said governor shaft to define a rotational position of said governor shaft; and
    a throttle cable interconnected with said accelerator cable and movable to limit the degree of throttle travel based on said first torque and said feedback torque.

2. The governor system of claim 1, further comprising a governor arm fixed for rotation with said governor shaft, wherein said accelerator cable is resiliently interconnected with said governor shaft through said governor arm and a rotational position of said governor arm defines the degree of throttle travel.

3. The governor system of claim 2, further comprising an accelerator pedal resiliently interconnected with said throttle cable to apply a second pulling force to said accelerator cable.

4. The governor system of claim 3, further comprising a compression spring for resiliently interconnecting said accelerator cable and said accelerator pedal, said compression spring selectively compressing to enable balancing of said torque with said feedback torque.

5. The governor system of claim 1, further comprising a compression spring for resiliently interconnecting said accelerator cable and said governor shaft, said compression spring selectively compressing to enable balancing of said torque with said feedback torque.

6. A vehicle having an engine and a drive axle receiving drive torque from the engine, comprising:
    a throttle operably interconnected to the engine and moveable by way of a throttle cable for varying a drive torque output thereof; and
    a governor system operably disposed intermediate to said pedal assembly and said throttle for limiting a degree of throttle travel as a function of rotational speed of the drive axle, said governor system including:
    a governor shaft operably interconnected to the drive axle, which varies a feedback force of said governor shaft based on a rotational speed of the drive axle; and
    an accelerator cable resiliently interconnected with said governor shaft to induce a first force acting against said feedback force on said governor shaft, said first force balancing with said feedback force of said governor shaft to define a rotational position of said governor shaft;
    wherein movement of said throttle cable is based on said first force and said feedback force.

7. The vehicle of claim 6, further comprising a governor arm fixed for rotation with said governor shaft, wherein said accelerator cable is resiliently interconnected with said governor shaft through said governor arm and a rotational position of said governor arm defines the degree of throttle travel.

8. The vehicle of claim 7, further comprising an accelerator pedal assembly including an accelerator pedal resiliently interconnected with said throttle cable to apply a second pulling force to said accelerator cable.

9. The vehicle of claim 8, wherein said accelerator pedal assembly further comprises a switch assembly operably interconnected to said accelerator pedal for initiating operation of the engine in response to rotation of said accelerator pedal.

10. The vehicle of claim 8, further comprising a compression spring for resiliently interconnecting said accelerator cable and said accelerator pedal, said compression spring selectively compressing to enable balancing of said torque with said feedback torque.

11. The vehicle of claim 6, further comprising a compression spring for resiliently interconnecting said accelerator cable and said governor shaft, said compression spring selectively compressing to enable balancing of said torque with said feed back torque.

12. A governor system for limiting a degree of throttle travel of a throttle as a function of rotational speed of a drive axle, comprising:
    a governor shaft operably interconnected to the drive axle, which varies a feedback torque of said governor shaft based on a rotational speed of the drive axle;
    an accelerator cable interconnected with said governor shaft to induce a first torque acting against said feedback torque on said governor shaft, said first torque balancing with said feedback torque of said governor shaft to define a rotational position of said governor shaft; and
    a throttle cable interconnected with said accelerator cable and movable to limit the degree of throttle travel based on said first torque and said feedback torque.

13. The governor system of claim 12, further comprising a governor arm fixed for rotation with said governor shaft, wherein said accelerator cable is resiliently interconnected with said governor shaft through said governor arm and a rotational position of said governor arm defines the degree of throttle travel.

14. The governor system of claim 13, further comprising an accelerator pedal resiliently interconnected with said throttle cable to apply a second pulling force to said accelerator cable.

15. The governor system of claim 14, further comprising a compression spring for resiliently interconnecting said accelerator cable and said accelerator pedal, said compression spring selectively compressing to enable balancing of said torque with said feedback torque.

16. The governor system of claim 12, further comprising a compression spring for resiliently interconnecting said accelerator cable and said governor shaft, said compression spring selectively compressing to enable balancing of said torque with said feedback torque.

17. The governor system of claim 12 further comprising a cover for covering components of the governor system.

18. The governor system of claim 14, further comprising a switch assembly operably interconnected to said accelerator pedal for initiating operation of the engine in response to rotation of said accelerator pedal.

* * * * *